United States Patent
Otey et al.

(10) Patent No.: US 9,053,584 B2
(45) Date of Patent: Jun. 9, 2015

(54) DISTRIBUTION OF MAIL PIECES ACROSS PRINT JOBS TO ENHANCE POSTAL DISCOUNTS IN A PRODUCTION PRINTING ENVIRONMENT

(75) Inventors: Ned Otey, Louisville, CO (US); David Stokes, Longmont, CO (US); Brent Winters, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 282 days.

(21) Appl. No.: 13/224,836

(22) Filed: Sep. 2, 2011

(65) Prior Publication Data

US 2013/0060377 A1    Mar. 7, 2013

(51) Int. Cl.
  *G07B 17/02*    (2006.01)
  *G07B 17/00*    (2006.01)
  *G06F 3/12*    (2006.01)

(52) U.S. Cl.
  CPC ........ *G07B 17/00362* (2013.01); *G06F 3/1211* (2013.01); *G06F 3/1218* (2013.01); *G06F 3/1262* (2013.01); *G06F 3/1282* (2013.01); *G06F 3/1285* (2013.01); *G07B 2017/0037* (2013.01); *G07B 2017/00451* (2013.01)

(58) Field of Classification Search
  CPC ................ G07B 2017/0037; G07B 17/00362; G06F 3/1285
  See application file for complete search history.

(56) References Cited

U.S. PATENT DOCUMENTS

| | | | |
|---|---|---|---|
| 5,025,610 A | 6/1991 | Graushar | |
| 5,119,306 A | 6/1992 | Metelits et al. | |
| 7,133,851 B1 | 11/2006 | Benson | |
| 2003/0088552 A1* | 5/2003 | Bennett et al. | 707/3 |
| 2004/0085580 A1* | 5/2004 | Kelleher et al. | 358/1.18 |
| 2008/0201185 A1 | 8/2008 | Winkelman et al. | |
| 2008/0239366 A1* | 10/2008 | Cyman et al. | 358/1.15 |
| 2009/0070191 A1* | 3/2009 | Gaito | 705/10 |
| 2009/0138878 A1* | 5/2009 | Fernstrom et al. | 718/102 |
| 2010/0049557 A1 | 2/2010 | Rojas et al. | |
| 2011/0047100 A1* | 2/2011 | Wojdyla | 705/404 |

OTHER PUBLICATIONS

Cagle, Erik, "Maximizing Postal Discounts," Printing Impressions, 50, 12, May 2008, pp. 73-74.*
"Postal Discount Optimization across Different Automated Mail Sort Groups in an ADF" downloaded from http://ip.com/IPCOM/000213164.

* cited by examiner

*Primary Examiner* — Nathan Erb
(74) *Attorney, Agent, or Firm* — Duft Bornsen & Fettig LLP

(57) ABSTRACT

Systems and methods are provided for enhancing postal discounts. The system receives multiple print jobs, each print job assigned for printing at a different printing system. Each print job comprises mail pieces that correspond with capabilities of the assigned printing system. The system identifies mail pieces of the print jobs that have delivery addresses that are not confirmed by a mailing address database ("non-automated mail pieces"), and extracts non-automated mail pieces that may be produced at printing systems having different capabilities. Further, the system determines a threshold number of non-automated mail pieces to reach a bulk postal discount for a print job, and redistributes the extracted mail pieces across the print jobs based upon the threshold to increase the number of print jobs that reach the bulk postal discount.

20 Claims, 4 Drawing Sheets

DISTRIBUTION OF MAIL PIECES ACROSS PRINT JOBS TO ENHANCE POSTAL DISCOUNTS IN A PRODUCTION PRINTING ENVIRONMENT

FIELD OF THE INVENTION

The invention relates to the field of printing, and in particular, to printing documents for mass-mailing.

BACKGROUND

Mail production systems generally include high-speed printers used for volume printing, and may be capable of printing hundreds of pages of content per minute or more. A typical mail production system includes multiple continuous-form printing systems that mark paper or other printable media. Automated Document Factory (ADF) systems provide modules that enhance the performance of mail production systems (and other high-volume printing systems). For example, an ADF system may functionally address input constraints, data transformation, delivery preparation of documents, and control of the mail production system itself. Because of this enhanced functionality, ADF systems are preferred for mass-mail printing.

Each printing system of the mail production system may include a printer and an inserter machine that places pre-printed inserts into printed mail pieces. Each inserter may have a different set of inserts available for placement among the mail pieces, and these sets of inserts are known as insert plans.

When mail pieces are produced in high volume (e.g., when the mail pieces are account statements from a large bank or credit provider), it may be necessary to print batches of hundreds of thousands, if not millions of mail pieces on a regular basis. In order to balance load upon the printing systems, the batch is split into print jobs, wherein each print job is targeted to a specific printing system. Splitting the mail pieces into different print jobs is no menial task, because each mail piece may require a different set of inserts than its peers (i.e., each mail piece may be associated with a different loadout/insert plan). Thus, mail pieces are typically assigned to print jobs based upon the inserts that the mail pieces will use. When mail pieces are distributed in this manner, each printer of the mail production system may have a different number of mail pieces to print (i.e., one printer may have to print a different number of mail pieces than its peers, because more documents in the batch are associated with that printer's insert plan). This in turn means that one of the printers may take longer to finish its print job than others, resulting in a non-optimal printing time for the batch. Therefore, the mail production system may identify plains (mail pieces that do not use an insert) among the batch, and may distribute these plains across the print jobs in order to balance the number of mail pieces in each print job and thereby reduce overall printing time for the batch.

Because of the high volume of production in such systems, even savings of pennies in producing and shipping each mail piece may result in significant long-term savings. Thus, operators of mail production systems continue to desire systems and methods for reducing the cost of producing and shipping mail pieces.

SUMMARY

Embodiments described herein provide systems and methods for redistributing mail pieces of incoming print jobs in order to increase postal discounts. In particular, the method identifies, for incoming print jobs, mail pieces having delivery addresses that have not been confirmed by a mailing address database (these are known in the art as "non-automated" mail pieces). The method then extracts non-automated mail pieces that may be printed at different printing systems. These extracted mail pieces are redistributed across the print jobs in order to increase the number of print jobs that qualify for bulk postal discounts. Thus, postal discounts for mail pieces having a poor address quality may be beneficially increased, reducing expenses.

One embodiment is a system that enhances postal discounts. The system comprises an interface and a data center. The interface is operable to receive multiple print jobs, each print job assigned for printing at a different printing system. Each print job comprises mail pieces that correspond with capabilities of the assigned printing system. The data center is operable to identify mail pieces of the print jobs that have delivery addresses that are not confirmed by a mailing address database ("non-automated mail pieces"), and to extract non-automated mail pieces that may be produced at printing systems having different capabilities. The data center is further operable to determine a threshold number of non-automated mail pieces to reach a bulk postal discount for a print job, and to redistribute the extracted mail pieces across the print jobs based upon the threshold to increase the number of print jobs that reach the bulk postal discount.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
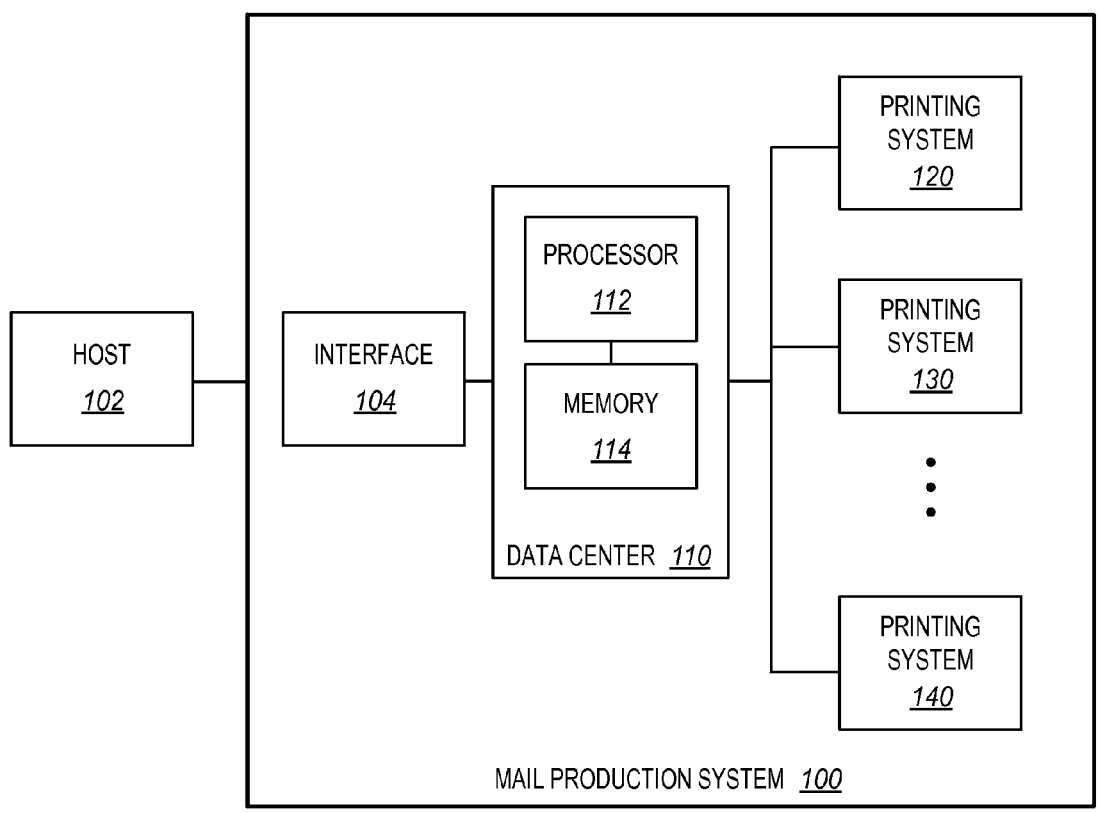
FIG. 1 is a block diagram of a mail production system in an exemplary embodiment.

FIG. 1 is a block diagram of a mail production system 100 in an exemplary embodiment. Mail production system 100 comprises any system, device, or component operable to turn incoming print data into physically deliverable packages for mailing. As referred to herein, a mail piece comprises a portion of print data intended for printing onto physical media and eventual transport to a specified delivery address. For example, a mail piece may be printed onto a sheet of paper and placed inside of an envelope, whereupon the envelope is later stamped, addressed, and shipped to the intended delivery location. In this embodiment, mail production system 100 comprises interface 104, data center 110 and printing systems 120-140. Assume that mail production system 100 receives batches of print jobs for printing from one or more hosts 102, via interface 104. In particular, assume that interface 104 receives print jobs targeted to printing systems 120-140, and assume that data center 110 redistributes mail pieces between the print jobs in order to optimize postal discounts for non-automated mail pieces. In this embodiment, data center 110 comprises processor 112 and memory 114 for performing logical operations on incoming print jobs.

Printing systems 120-140 comprise any combination of production printing systems and associated post-processing machinery (e.g., inserters, staplers, hole punchers, etc.). Printing systems 120-140 may comprise a greater or lesser number of printing systems than depicted in FIG. 1. Preferably, printing systems 120-140 include high volume continuous-form printers. Each of printing systems 120-140 has a different set of processing capabilities than its peers (i.e., each of printings systems 120-140 has a set of capabilities that is not shared universally across all of printing systems 120-140). For example, printing system 120 may include an inserter having a different set of inserts available than other inserters at other printing systems. In a further example, the ink or media available at a printer of printing system 120 may be different than for other printing systems. When data center 110 receives a batch of print jobs from host 102 via interface 104, each print job is targeted to a specific printing system 120-140. For example, each of the mail pieces in a print job for printing system 120 may be compliant with the set of inserts available at printing system 120.

While in operation, mail production system 100 is operable to receive incoming batches of print jobs from a host 102, and to redistribute mail pieces across print jobs in order to increase postal discounts for non-automated mail within each print job. Automated mail pieces are mail pieces associated with delivery addresses that can be interpreted by a machine to indicate an exact postal delivery location (e.g., mail having a barcode indicating an exact mailing address). The address for a piece of automated mail corresponds with/matches an address in a mailing address database of the postal delivery service that will deliver the mail piece (e.g., FedEx, UPS, the United States Postal Service (USPS), etc.). Thus, postal services prefer automated mail because they may determine with certitude the intended delivery location for an automated mail piece. Automated mail is generally subject to discounts when grouped by ZIP code. In contrast, non-automated mail is mail that is not associated with a specific delivery location in a mailing address database. For example, non-automated mail may include a typo in an address (e.g., may refer to a street as a boulevard, may leave out an apartment number, etc.), or may otherwise include imperfections that prevent it from matching an address in a mailing address database. Because non-automated mail is generally harder to process than automated mail, postal services usually provide different (and smaller) discounts for non-automated mail than for automated mail. However, non-automated mail typically remains subject to a discount whenever provided to a postal service in bulk.

It will be appreciated that, in a production printing environment where hundreds of thousands of mail pieces are produced on a regular basis, sorting mail pieces by hand is incredibly time consuming and expensive. Because of this, hand-sorting of mail produced at each of printing systems 120-140 in order to achieve discounts is infeasible. Rather, the mail pieces of print jobs at data center 110 are pre-sorted in digital form so that when they are printed and packaged, they are grouped to achieve the intended postal discounts.

Mail production system 100 is operable to achieve further discounts than those associated with automated mail piece sorting, because mail production system 100 is capable of receiving print jobs that include both non-automated and automated mail, distinguishing the non-automated from the non-automated mail pieces, and redistributing non-automated mail pieces across print jobs to in order to increase the number of print jobs that qualify for non-automated mail discounts. This in turn reduces the cost of mailing, thereby generating a greater amount of savings. Further details of the operation of mail production system 100 will be discussed with regard to FIG. 2. Assume, for this embodiment, that mail production system 100 initializes and prepares to process incoming batches of print jobs sent from one or more hosts 102.

Figure 2:
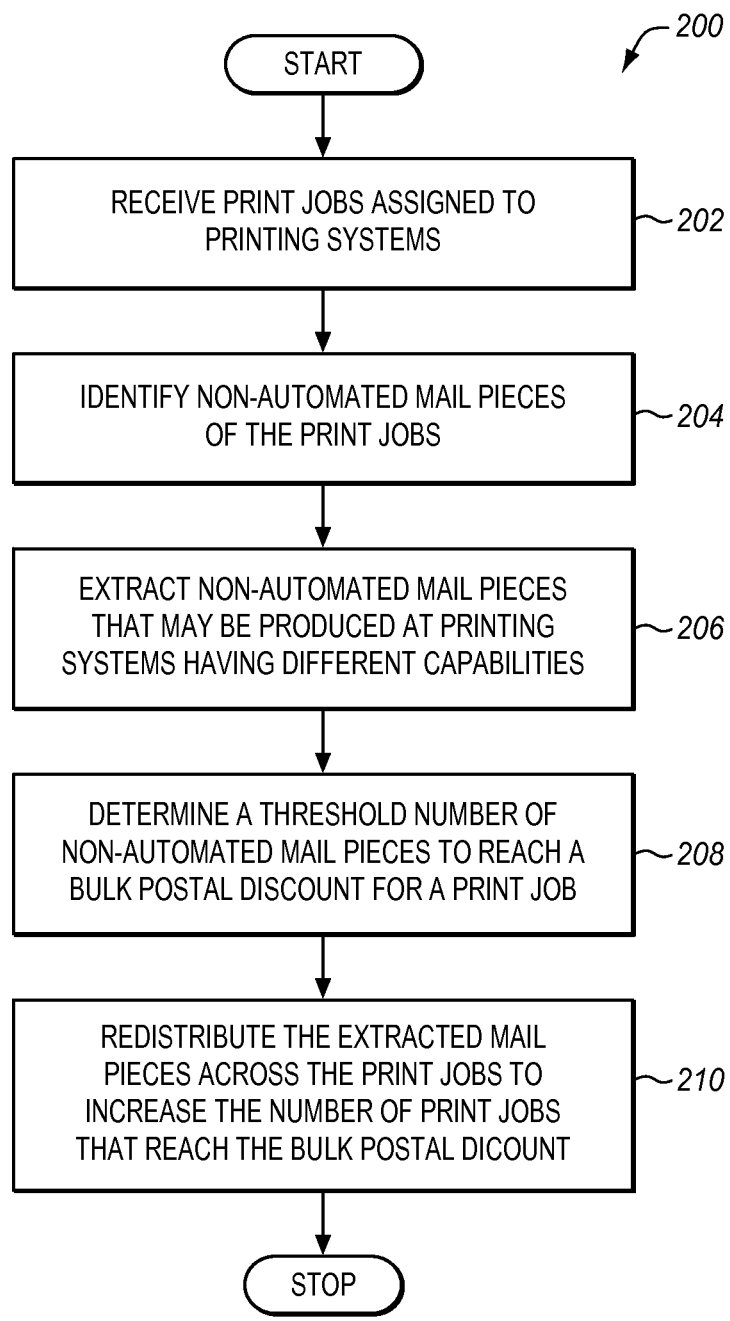
FIG. 2 is a flowchart illustrating a method for optimizing postal discounts for non-automated mail pieces in an exemplary embodiment.

FIG. 2 is a flowchart illustrating a method for optimizing postal discounts for non-automated mail pieces in an exemplary embodiment. The steps of method 200 are described with reference to mail production system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, interface 104 of mail production system 100 receives multiple print jobs. Each print job is assigned to one of printing systems 120-140, and each of printing systems 120-140 has a different set of processing capabilities (e.g., each printing system may utilize a different inserter plan). The mail pieces of each print job correspond to the capabilities of their intended printer. This means that mail pieces in each print job can be printed and processed as intended by the assigned printing system. For example, the ink available at the printer and post-processing systems available at the printer may match the ink and post-processing requirements for the mail pieces of the print job. As a further feature, the mail pieces of each incoming print job are mixed into automated and non-automated mail pieces.

In step 204, data center 110 identifies mail pieces of the print jobs that have delivery addresses that are not confirmed by a mailing address database ("non-automated mail pieces"). This step may involve distinguishing the non-automated mail pieces from automated mail pieces within the print jobs. Data center 110 may perform this operation by parsing each print job, identifying the mail pieces of the print job, and generating a list indicating whether each mail piece comprises an automated or non-automated mail piece. Data center 110 may, for example, perform this action by actively querying a mailing address database (e.g., via a network) to determine whether a delivery address for a mail piece of a print job has an exact match. In another embodiment, data center 110 may review metadata for the print jobs that indicates whether certain mail pieces are automated or non-automated.

In step 206, data center 110 extracts, from the print jobs, non-automated mail pieces that may be produced at printing systems having different capabilities. These mail pieces may therefore be printed at multiple different printing systems, even though those printing systems do not share the exact same set of capabilities. An example of a mail piece that may be produced by more than one printing system is a plain. Plains are mail pieces that are not associated with inserts (i.e., plains do not use inserts). If the only differences between the capabilities of printing systems 120-140 are based upon the number and type of inserts provided by those printing systems, then plains may be printed at any of printing systems 120-140 in mail production system 100. This means that plains may be freely moved across print jobs. Plains are not the only example of a category of mail pieces that may be moved across jobs, and one of ordinary skill in the art will appreciate that numerous different categories may be defined, depending upon the differing capabilities of printing systems 120-140.

The extraction of the mail pieces may occur in a number of different ways. For example, data center 110 may actually remove the print data of the mail pieces from the print jobs themselves, for later re-assignment to a new print job. In another embodiment, mail pieces may be "extracted" by generating a list that identifies the location, name, or other identifier that indicates a location of a mail piece in a print job. Then, when a mail piece is redistributed, the print data for the mail piece is moved to the appropriate print job.

Note that, in addition to automated and non-automated mail pieces, the print jobs may include full rate (also known as "single piece") mail items that do not qualify for any sort of postal discounts. There is no benefit to assigning such mail pieces to different print jobs, because these jobs can never qualify for postal discounts. Thus, it may be desirable to discard these full rate mail pieces from the extracted mail pieces, or to not extract these mail pieces in the first place.

In step 208, data center 110 determines a threshold number of non-automated mail pieces for achieving a bulk postal discount for a print job. This threshold will typically be different than the thresholds used to achieve bulk discounts for automated mail pieces. The threshold number may be stored in memory 114 or may be provided by host 102. In one embodiment, data center 110 queries a postal service server in order to determine the threshold level.

Once a pool of mail pieces has been extracted, data center 110 is operable to redistribute extracted mail pieces across the print jobs in order to increase the number of jobs that qualify for the bulk non-automated mail piece discount, as in step 210. This is typically performed by increasing the number of non-automated mail pieces in the print jobs until they reach the determined threshold number.

In one embodiment, data center 110 determines the number of non-automated mail pieces in each print job, and then sorts the print jobs in descending order, based upon the number of non-automated mail pieces remaining in each job. Preferably, the number of non-automated mail pieces in each job is the number of non-automated mail pieces that each print job has after the extraction process of step 206 has been performed. However, embodiments are possible wherein this number is calculated before the extraction has occurred. Starting with the job having the greatest number of non-automated mail pieces, data center 110 determines whether the job qualifies for the bulk discount. If the job already qualifies, then data center 110 moves on to the next print job. However, if the job requires more non-automated mail pieces to qualify for the discount, data center 110 assigns enough mail pieces from the pool to qualify the print job for the discount. In this manner, mail pieces from the pool are combined with non-automated mail in the print jobs in order to achieve a discount. Data center 110 may continue this process until all print jobs have reached the threshold, or until no more identified mail pieces are available for assignment to print jobs. If all print jobs qualify for the non-automated mail discount, then data center 110 may distribute remaining mail pieces from the pool to ensure that each print job takes a substantially similar amount of time to print as its peers.

Using method 200 described above, an operator of a mail production system may beneficially process and discount print jobs including both automated and non-automated mail. Furthermore, the operator may redistribute mail pieces across incoming print jobs in order to enhance discounts for non-automated pieces of mail. This in turn reduces costs for the mail production system.

EXAMPLES

In the following examples, additional processes, systems, and methods are described in the context of a mail production system that distributed non-automated pieces of mail across incoming print jobs in order to enhance postal discounts.

Figure 3:
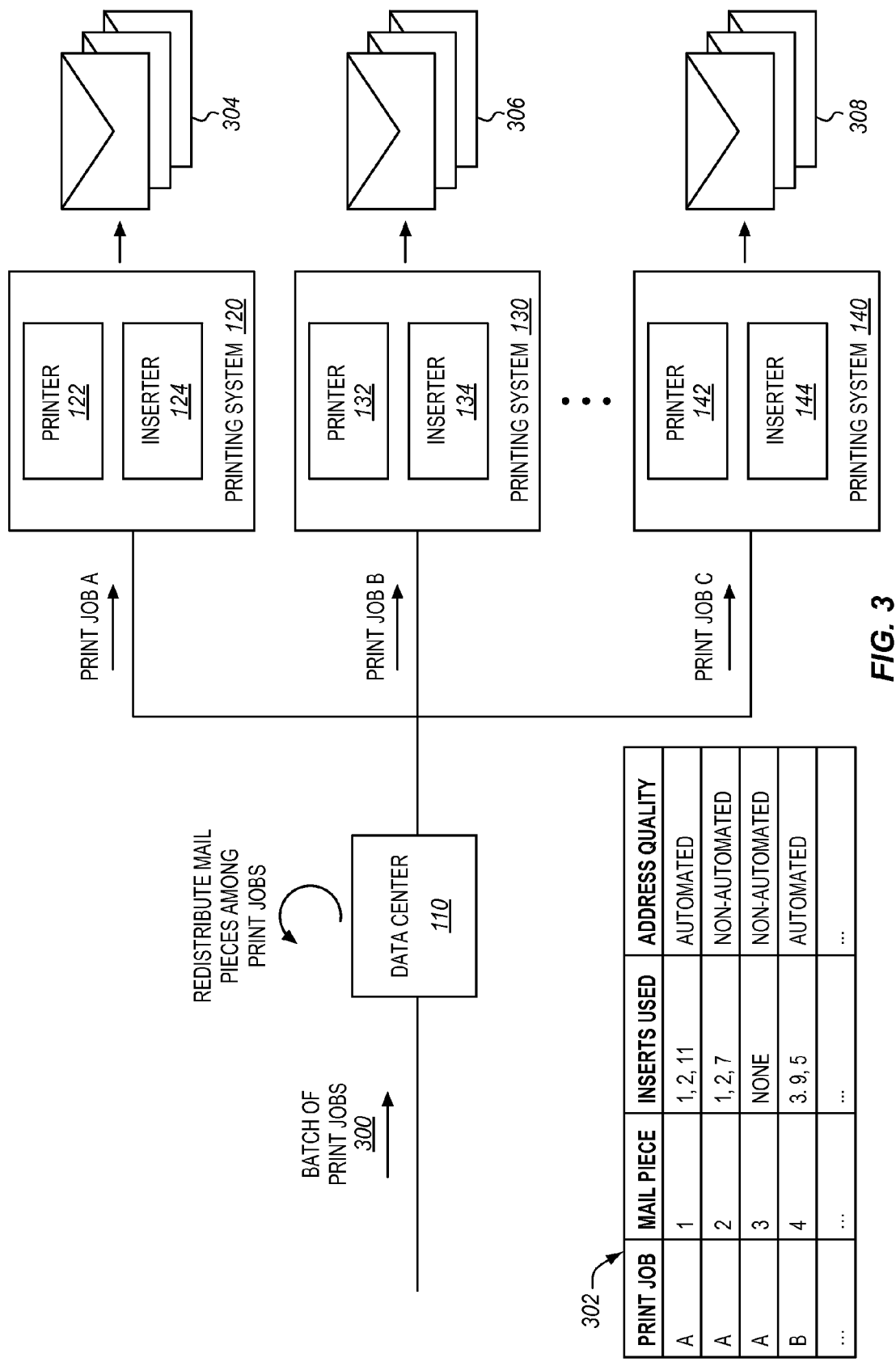
FIG. 3 is a block diagram illustrating an exemplary batch of print jobs processed by a mail production system in an exemplary embodiment.

FIG. 3 is a block diagram illustrating an exemplary batch of print jobs 300 processed by mail production system 100 in an exemplary embodiment. In this example, batch of print jobs 300 is associated with a table 302 that identifies each mail piece in the batch, identifies the print job associated with each mail piece, identifies the inserts used by each mail piece, and identifies whether each mail piece is an automated or non-automated mail piece.

Using the information from table 302, data center 110 redistributes the mail pieces among the print jobs in the following manner: data center 110 identifies non-automated plains (mail pieces not associated with an insert) within the batch as distinct from the automated mail pieces, based upon the information in table 302. Data center 110 then proceeds to extract each non-automated plain from the batch. Once the non-automated plains have been removed from the batch, data center 110 sorts the print jobs (print jobs A, B, C) in descending order based upon the number of non-automated mail pieces that remain in each print job. Starting with the print job having the greatest number of non-automated mail pieces, data center 110 determines whether the print job requires any further mail pieces in order to achieve a non-automated mail discount. Then, proceeding across the print jobs in descending order of non-automated mail pieces, data center 110 assigns the minimum number of mail pieces required for each job to reach the discount. If any non-automated plains remain after each job has met the discount, data center 110 assigns these non-automated plains across the print jobs in order to maximize printing speed.

The redistributed print jobs are then transmitted by data center 110 to printing system 120-140, and printing systems 120-140 generate deliverable sets of physical mail pieces 304-308 for delivery. In this embodiment, each printing system 120-140 comprises a printer and an inserter used to physically produce the mail pieces of the print jobs (i.e., printing system 120 comprises printer 122 and inserter 124, printing system 130 comprises printer 132 and inserter 134, and printing system 140 comprises printer 142 and inserter 144).

Figure 4:
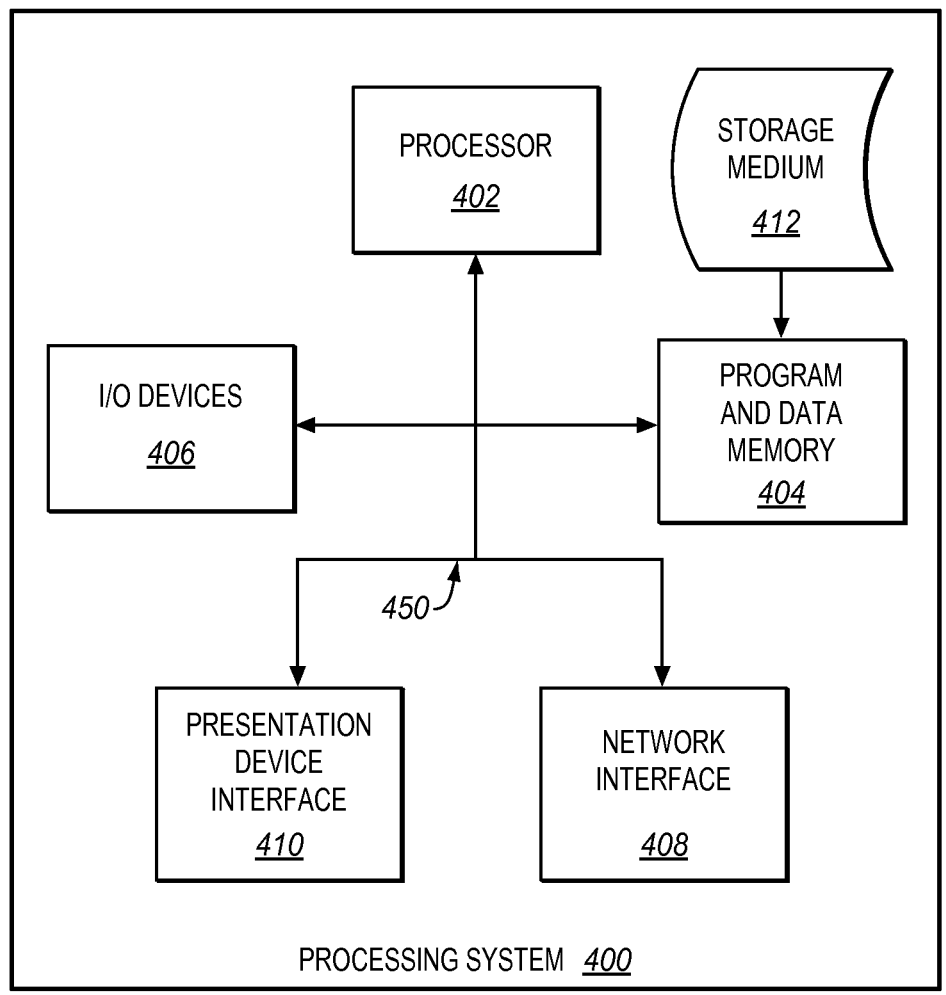
FIG. 4 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of mail production system 100 to perform the various operations disclosed herein. FIG. 4 illustrates a processing system operable to execute a computer readable medium embodying programmed instructions to perform desired functions in an exemplary embodiment. Processing system 400 is operable to perform the above operations by executing programmed instructions tangibly embodied on a computer readable storage medium 412. In this regard, embodiments of the invention can take the form of a computer program accessible via the computer-readable medium 412 providing program code for use by a computer or any other instruction execution system. For the purposes of this description, a computer readable storage medium 412 can be anything that can contain or store the program for use by the computer.

The computer readable storage medium 412 can be an electronic, magnetic, optical, electromagnetic, infrared, or semiconductor device. Examples of the computer readable storage medium 412 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 400, being suitable for storing and/or executing the program code, includes at least one processor 402 coupled to memory elements 404 through a system bus 450. The memory elements 404 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 406 (including but not limited to keyboards, displays, pointing devices, etc.) can be coupled to the system either directly or through intervening I/O controllers. Network adapter interfaces 408 may also be coupled to the system to enable the processing system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 410 may be coupled to the system to interface to one or more presentation devices, such as printing systems and displays for presentation of presentation data generated by processor 402.

Although specific embodiments were described herein, the scope of the invention is not limited to those specific embodiments. The scope of the invention is defined by the following claims and any equivalents thereof.

We claim:

1. A system comprising:
at least two printing systems, each printing system comprising a printer and an inserter, and each printing system having a different set of capabilities;
an interface configured to receive multiple print jobs, each print job assigned for printing at one of the printing systems, each print job comprising mail pieces that correspond with the capabilities of the assigned printing system; and
a data center comprising a processor configured to identify mail pieces of the print jobs that have delivery addresses that are not confirmed by a mailing address database ("non-automated mail pieces"), to extract non-automated plain mail pieces that are assigned to the print jobs, to determine a threshold number of non-automated mail pieces to qualify for a bulk postal discount for a print job, and to redistribute the extracted mail pieces across the print jobs in order to qualify at least one of the print jobs for the discount, wherein the extracted mail pieces are assigned to print jobs beginning with the print job having a greatest number of non-automated mail pieces that does not qualify for the discount, and continuing to any further print jobs in the order of descending number of non-automated mail pieces in each print job;
wherein a plain mail piece is a mail piece that does not include any inserts, and an insert is a document that has been pre-printed separately from the multiple print jobs,
wherein the capabilities of the assigned printing system comprise types of inserts available to the printing system for producing mail pieces that are assigned to the printing system, and
wherein the printing systems are configured to produce the mail pieces in accordance with the print jobs as modified by the redistributing of the extracted mail pieces, wherein producing the mail pieces comprises inserting, by an inserter, at least one insert into at least one mail piece.

2. The system of claim 1, wherein:
the data center is further operable, for each print job, to redistribute the extracted mail pieces by:
determining whether the print job already has a sufficient number of non-automated mail pieces to qualify for the bulk postal discount; and
responsive to determining that the print job does not qualify for the bulk postal discount, assigning extracted non-automated mail pieces to the print job until the print job qualifies for the bulk postal discount.

3. The system of claim 2, wherein:
the data center is further operable to sort the print jobs based upon the number of non-automated mail pieces in each print job, and to redistribute mail pieces to the print jobs starting with the job having the largest number of non-automated mail pieces.

4. The system of claim 1, wherein:
the data center is further operable to identify full rate mail pieces of the print jobs, and to discard the full rate mail pieces from the extracted non-automated mail pieces prior to redistributing the extracted mail pieces across the print jobs.

5. The system of claim 1, wherein:
each of the inserters has a unique set of inserts available for inserting into an envelope.

6. The system of claim 1, wherein:
the data center is further operable to extract mail pieces by removing print data for the mail pieces from their corresponding print jobs.

7. The system of claim 1, wherein:
the mailing address database is used by a postal service that will deliver the mail pieces.

8. The system of claim 1, wherein:
mail pieces that are not confirmed by a mailing address database comprise mail pieces having a delivery address that does not match any address at the mailing address database.

9. A method comprising:
receiving multiple print jobs, each print job assigned for printing at one of multiple printing systems, each print job comprising mail pieces that correspond with the capabilities of the assigned printing system, wherein each of the multiple printing systems comprises a printer and an inserter, and each printing system has a different set of capabilities;
identifying mail pieces of the print jobs that have delivery addresses that are not confirmed by a mailing address database ("non-automated mail pieces");

extracting non-automated plain mail pieces that are assigned to the print jobs;

determining a threshold number of non-automated mail pieces to qualify for a bulk postal discount for a print job;

redistributing, by a computer system, the extracted mail pieces across the print jobs in order to qualify at least one of the print jobs for the discount, wherein the extracted mail pieces are assigned to print jobs beginning with the print job having a greatest number of non-automated mail pieces that does not qualify for the discount, and continuing to any further print jobs in the order of descending number of non-automated mail pieces in each print job; and producing, by the printing systems, the mail pieces in accordance with the print jobs as modified by the redistributing, wherein producing the mail pieces comprises inserting, by an inserter, at least one insert into at least one mail piece;

wherein a plain mail piece is a mail piece that does not include any inserts, and an insert is a document that has been pre-printed separately from the multiple print jobs, and wherein the capabilities of the assigned printing system comprise types of inserts available to the printing system for producing mail pieces that are assigned to the printing system.

10. The method of claim 9, wherein:

redistributing the extracted mail pieces comprises:
  for each print job:
    determining whether the print job already has a sufficient number of non-automated mail pieces to qualify for the bulk postal discount; and
    responsive to determining that the print job does not qualify for the bulk postal discount, assigning extracted non-automated mail pieces to the print job until the print job qualifies for the bulk postal discount.

11. The method of claim 10, wherein:

redistributing the extracted mail pieces further comprises:
  sorting the print jobs based upon the number of non-automated mail pieces in each print job; and
  redistributing mail pieces to the print jobs starting with the job having the largest number of non-automated mail pieces.

12. The method of claim 9, further comprising:

identifying full rate mail pieces of the print jobs; and discarding the full rate mail pieces from the extracted non-automated mail pieces prior to redistributing the extracted mail pieces across the print jobs.

13. The method of claim 9, wherein:

each of the inserters has a unique set of inserts available for inserting into an envelope.

14. The method of claim 9, wherein:

extracting mail pieces comprises removing print data for the mail pieces from their corresponding print jobs.

15. The method of claim 9, wherein:

the mailing address database is used by a postal service that will deliver the mail pieces.

16. The method of claim 9, wherein:

mail pieces that are not confirmed by a mailing address database comprise mail pieces having a delivery address that does not match any address at the mailing address database.

17. A non-transitory computer-readable medium having programmed instructions stored thereon which, when executed by a processor, cause the processor to perform a method comprising:

receiving multiple print jobs, each print job assigned for printing at one of multiple printing systems, each print job comprising mail pieces that correspond with the capabilities of the assigned printing system, wherein each of the multiple printing systems comprises a printer and an inserter, and each printing system has a different set of capabilities;

identifying mail pieces of the print jobs that have delivery addresses that are not confirmed by a mailing address database ("non-automated mail pieces");

extracting non-automated plain mail pieces that are assigned to the print jobs;

determining a threshold number of non-automated mail pieces to qualify for a bulk postal discount for a print job;

redistributing the extracted mail pieces across the print jobs in order to qualify at least one of the print jobs for the discount, wherein the extracted mail pieces are assigned to print jobs beginning with the print job having a greatest number of non-automated mail pieces that does not qualify for the discount, and continuing to any further print jobs in the order of descending number of non-automated mail pieces in each print job; and causing the printing systems to produce the mail pieces in accordance with the print jobs as modified by the redistributing, wherein producing the mail pieces comprises inserting, by an inserter, at least one insert into at least one mail piece;

wherein a plain mail piece is a mail piece that does not include any inserts, and an insert is a document that has been pre-printed separately from the multiple print jobs, and wherein the capabilities of the assigned printing system comprise types of inserts available to the printing system for producing mail pieces that are assigned to the printing system.

18. The medium of claim 17, wherein, for the method:

redistributing the extracted mail pieces comprises:
  for each print job:
    determining whether the print job already has a sufficient number of non-automated mail pieces to qualify for the bulk postal discount; and
    responsive to determining that the print job does not qualify for the bulk postal discount, assigning extracted non-automated mail pieces to the print job until the print job qualifies for the bulk postal discount.

19. The medium of claim 17, wherein, for the method:

redistributing the extracted mail pieces further comprises:
  sorting the print jobs based upon the number of non-automated mail pieces in each print job; and
  redistributing mail pieces to the print jobs starting with the job having the largest number of non-automated mail pieces.

20. The medium of claim 17, wherein the method further comprises:

identifying full rate mail pieces of the print jobs; and discarding the full rate mail pieces from the extracted non-automated mail pieces prior to redistributing the extracted mail pieces across the print jobs.

* * * * *